March 17, 1959      D. RUCCI      2,877,734
BICYCLE TURN SIGNAL
Filed Oct. 22, 1956
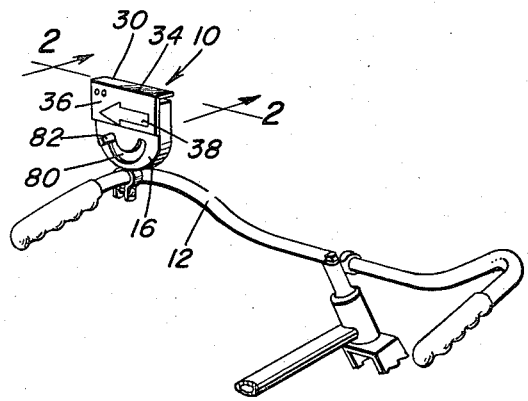
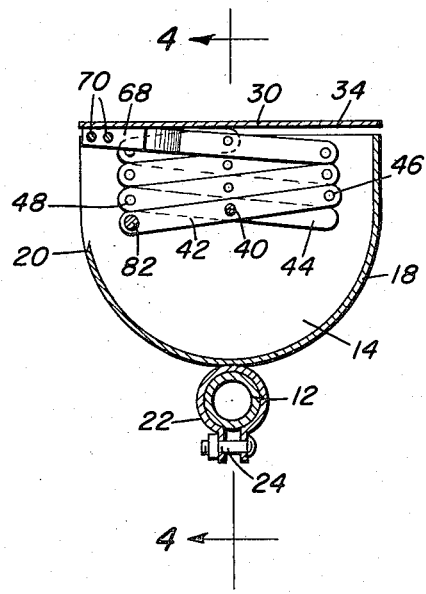
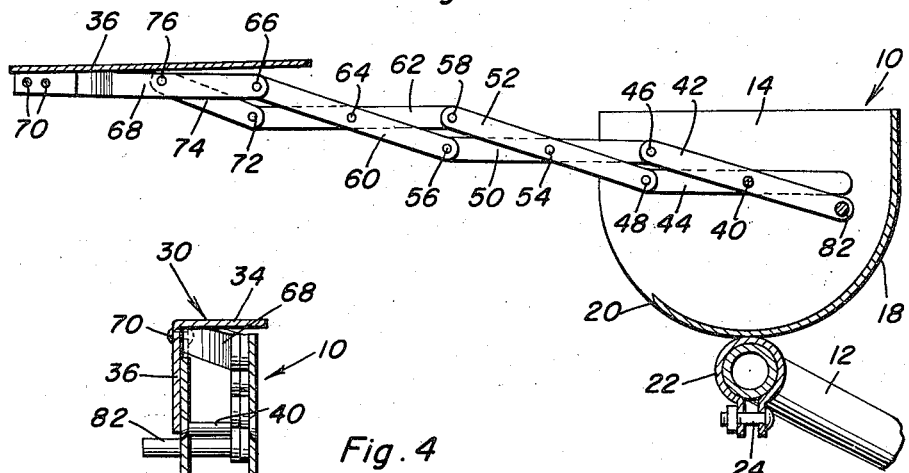
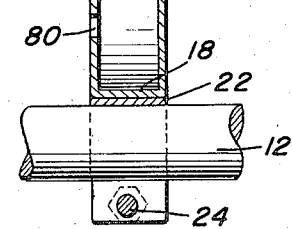
Domenic Rucci
    INVENTOR.
BY *Clarence A. O'Brien*
*and Harvey B. Jacobson*
             Attorneys

United States Patent Office 2,877,734
Patented Mar. 17, 1959

2,877,734

BICYCLE TURN SIGNAL

Domenic Rucci, Neenah, Wis.

Application October 22, 1956, Serial No. 617,503

2 Claims. (Cl. 116—40)

This invention comprises a novel and useful bicycle turn signal and more particularly relates to a signaling device adapted for mounting upon the handle bars of bicycles and the like.

The primary object of this invention is to provide a manually operable signaling device, specifically adapted for convenient mounting upon the handle bars of a bicycle, motorcycle or the like, for affording a visual signal to persons following the vehicle upon which it is mounted.

A further object of the invention is to provide a signaling device in accordance with the foregoing objects which shall be of compact and ornamental appearance, may be readily mounted upon the handle bars of a bicycle and the like, and may be readily manually operated to afford a clear visual signal.

A further important object of the invention is to provide a signaling device in conformance with the preceding objects which will be easily operated by the rider of the bicycle without the necessity for removal of his hands from the handle bars of the vehicle.

An additional important object of the invention is to provide a signaling device as set forth in the preceding objects wherein the signaling member in its recocked position also serves as a closure for the housing containing its actuating mechanism.

And a final important object of the invention to be specifically enumerated herein recites the provision of a signaling device as set forth in the above-mentioned objects wherein a simple and effective actuating mechanism may be provided for selectively extending the signal member to one side of the bicycle to thereby provide a visual signal to persons following the vehicle and may be readily retracted into a compact position to form a closure for the housing of the same in its idle position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing a portion of the handle bar assembly of a bicycle or motorcycle and to which the signaling device in accordance with this invention has been applied;

Figure 2 is a vertical transverse sectional view taken substantially upon the plane indicated by the section line 2—2 of Figure 1 and showing the internal details of the signaling device, the latter being in its recocked or idle position;

Figure 3 is a view similar to Figure 2 but showing the signaling device in its extended or signaling position; and Figure 4 is a vertical transverse sectional vew taken substantially upon the plane indicated by the section line 4—4 of Figure 2 and showing further details of the interior of the housing of the signaling device and the actuating mechanism disposed therein.

The primary intent of this invention is to provide a signaling device which shall have an attractive appearance whereby to form a decorative unit for bicycles and the like, may be very compactly mounted upon the handle bars of a bicycle, and will enable the rider to readily actuate the device to afford a visual signal to persons following the bicycle without the necessity for the rider of moving his hands from the handle bars of his vehicle.

In the accompanying drawings, the numeral 10 designates generally the improved signaling device which has been illustrated as being mounted upon the handle bar assembly 12 of a bicycle, motorcycle or other similar vehicle.

The signaling device consists of a housing having parallel vertical side walls 14 and 16 disposed at the front and rear thereof, these walls having curving bottom and side edges to which are secured a curved member 18 comprising a side and bottom wall for the device. The member 18 is cut-away as at 20 at one side thereof to provide an opening in one end wall of the housing, and the latter is provided with an open top.

A mounting means consisting of a friction clamp 22 is integrally or otherwise rigidly attached to the curved member 18 at the bottom of the device and by means of a clamping bolt 24 serves to secure the device upon the handle bar assembly 12 previously mentioned.

A member 30 is provided which serves the dual functions of constituting a movable closure for the open top of the housing of the device 10 and also constitutes a signaling member. For this purpose the member 30 consists of a flat plate 32 of sufficient size to overlie and form a closure for the housing, as shown in Figure 2, and which has a perpendicularly disposed vertical depending surface 36 which constitutes a signaling surface or element. The depending member 36 may consist of or be coated with a light reflective material, and if desired may be provided with a signaling arrow as at 38 in Figure 1. The surface of the member 36, when extended to the side of the device as suggested in Figure 3, will present its signaling and reflective surface 36 to visually indicate to persons following the vehicle of the intention of the rider to make a left turn, and to warn them of the presence of the vehicle.

An actuating means is provided for securely connecting the member 30 to the housing of the device 10, and is manually operable for selectively positioning the signaling member 30 to form a closure for the housing and thus protect the interior of the same from the elements as shown in Figures 1, 2 and 4, or to selectively extend the member 30 to one side of the housing as shown in Figure 3. For that purpose, the actuating means is extensible through the opening 20 as clearly shown in Figure 3.

In the interest of positive control of the motion of the signaling member 30, the actuating means therefor, as shown in Figures 2 and 3, preferably consists of a toggle linkage. For this purpose there is pivotally secured between the front and rear walls 14 and 15 of the housing a central shaft or axle 40 and a pair of links 42 and 44 are centrally pivoted to this axle as will be best apparent from Figure 3.

The ends of the links 42 and 44 are provided with pivot pins 46 and 48, respectively, to which are secured the adjacent extremities of a second pair of links 50 and 52 having intermediate their ends a common pivot 54. The second pair of links, in turn, are pivotally secured as at 56 and 58 to the end portions of a third pair of links 60 and 62 which are pivotally connected at their midportions as by the pivot pin 64. The link 60 is pivotally connected at 66 to a bracket member 68 rivited or otherwise secured as at 76 to the depending or side member 36 of the signaling member 30, as shown in Figures 3 and 4. The link 62 has its free extremity pivoted as at 72 to a connecting link 74 which is likewise pivoted as at 76 to the bracket 68. There is thus provided a toggle linkage or lazytongs which is so constructed that the signaling member 30 may be moved from its closure position of Figure 2 to its laterally extending position of Figure 3 while remaining parallel to itself at all times. For this purpose, the lazytongs are extended or flattened, and are projected through the opening 20 to carry the signaling member to its laterally extended position.

In order to actuate the lazytongs assembly, without the necessity for the rider removing his hands from the handle bars of the vehicle, the wall 60 is provided with an arcuate slot 80 therethrough and a finger-grip pin 82 projecting from the extremity of one of the pair of links 42 and 44 extends through the slot as shown in Figures 1 and 4. The slot thus guides the pin which in turn constitutes an operating means for manually actuating the actuating mechanism.

It will thus be seen that when it is desired to use the device, the rider merely places his thumb upon the finger pin 82, and moves the latter along the arcuate slot 80, thereby causing the lazytongs or toggle linkage to extend laterally and thus move the signaling member from its closure position to its signaling position. The signaling member can be retracted by merely reversing this operation.

It will thus be apparent that there has been provided a compact signaling device in which the signaling member not only functions to selectively provide a signal, visible to the rear of the vehicle, but also serves as a closure for the interior of the housing in which the actuating mechanism of the signaling member is housed.

Although the drawings disclose the signal indicator as being mounted on the left handle bar and as designating a left turn, it will be understood that in some instances right turn signals may be employed, or the indicator may be mounted on the right handle bar or both such signals and mountings may be employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually operable signaling device for bicycles comprising a housing having side walls and an open top, mounting means carried by said housing for securing the latter upon a bicycle handle bar, a signaling member including a movable flat plate adapted to overlie said open top and constitute a closure therefor, a depending plate secured to one edge of said flat plate and having a light reflective surface thereon and adapted to overlie in side-by-side relation a side wall of said housing when said flat plate overlies said open top, a bracket secured to said depending plate and disposed beneath said flat plate, one of said side walls having an opening therein, an extensible means pivotally secured to said bracket and pivotally secured to said housing in the interior thereof and extensible through said opening for moving said signaling member from a position closing said open top to a signaling position in laterally spaced relation to said housing, said housing having a slot in a side wall thereof, operating means connected to said extensible means and projecting through said slot to the exterior of said housing for manually operating said extensible means.

2. A visual signaling means for bicycles comprising a housing having side walls, and an open top, means secured to said housing for attaching the latter to a bicycle handle bar, a movable combined closure and signaling member comprising a flat plate and a depending plate secured to one edge of the latter and having a light reflective signaling surface thereon, said depending plate being disposed to overlie a side wall in side-by-side relation when the flat plate overlies said open top as a closure therefor, a bracket carried by said depending plate and positioned beneath said flat plate, a side wall adjacent said bracket having an opening therethrough, an extensible linkage assembly pivotally connected to said bracket and pivotally connected to said housing within the latter and extensible through said opening during movement of said signaling member from its top closing to its signaling position laterally disposed from said housing, said housing having a slot in the side wall overlaid by said depending plate, operating means projecting through and slidable in said slot and connected in the interior of said housing to said linkage assembly for manually operating the latter.

References Cited in the file of this patent

UNITED STATES PATENTS

| 1,913,051 | Good | June 6, 1933 |

FOREIGN PATENTS

| 632,161 | Germany | July 3, 1936 |